(12) United States Patent
Agashe et al.

(10) Patent No.: US 8,064,398 B2
(45) Date of Patent: Nov. 22, 2011

(54) SEAMLESS INTERFREQUENCY HANDOFF IN A HIGH DATA RATE WIRELESS SYSTEM

(75) Inventors: Parag A. Agashe, San Diego, CA (US); Ramin Rezaiifar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 832 days.

(21) Appl. No.: 11/102,224

(22) Filed: Apr. 8, 2005

(65) Prior Publication Data

US 2006/0252428 A1    Nov. 9, 2006

(51) Int. Cl.
*H04W 4/00* (2009.01)
*H04L 12/50* (2006.01)
*H04W 36/00* (2009.01)

(52) U.S. Cl. ............... 370/331; 370/370; 455/436

(58) Field of Classification Search .......... 370/331, 370/370; 455/436
See application file for complete search history.

(56) References Cited

U.S. PATENT DOCUMENTS

| | | | |
|---|---|---|---|
| 6,078,570 A * | 6/2000 | Czaja et al. ............. | 370/331 |
| 6,456,847 B1 | 9/2002 | Lilja et al. | |
| 6,845,238 B1 | 1/2005 | Mueller | |
| 2002/0082019 A1* | 6/2002 | Sunay et al. ............. | 455/442 |
| 2004/0170136 A1* | 9/2004 | Woo et al. ............... | 370/320 |
| 2005/0124345 A1* | 6/2005 | Laroia et al. ............ | 455/437 |
| 2006/0067273 A1* | 3/2006 | Suman et al. ............ | 370/331 |
| 2006/0187970 A1* | 8/2006 | Lee et al. ................ | 370/516 |
| 2006/0227744 A1* | 10/2006 | Metke et al. ............ | 370/331 |

FOREIGN PATENT DOCUMENTS

| | | |
|---|---|---|
| CN | 1399855 | 2/2003 |
| JP | 2003509982 | 3/2003 |
| WO | WO99/43178 | 8/1999 |
| WO | WO 0120942 A1 * | 3/2001 |

OTHER PUBLICATIONS

TIA-856-A, "cdma 2000 High Rate Packet Data Air Interface Specification", Apr. 2004, Chapter 14, p. 27.*
International Search Report and Written Opinion—PCT/US2006/013881, International Search Authority—European Patent Office—Aug. 29, 2006.
Taiwanese Search report—095136044—TIPO—Jul. 20, 2009.

* cited by examiner

*Primary Examiner* — Daniel J Ryman
*Assistant Examiner* — John Blanton
(74) *Attorney, Agent, or Firm* — Kristine U. Ekwueme (57) ABSTRACT

A high data rate system capable of inter-frequency handoffs with little or no interruption in data service. The access network sends data from the first sector to the access terminal at the first frequency. The access terminal measures a parameter of a signal received at the access terminal from the second sector at the second frequency, wherein a pre-active set of the access terminal includes the second sector, and wherein an active set of the access terminal consists of one or more sectors operating in the first frequency. The access terminal then sends a data source control message corresponding to the second sector to the access network, after which the access terminal switches the pre-active set and the active set.

42 Claims, 9 Drawing Sheets

SEAMLESS INTERFREQUENCY HANDOFF IN A HIGH DATA RATE WIRELESS SYSTEM

BACKGROUND

1. Field

The present invention relates generally to wireless communications, and more specifically to inter-frequency hard handoff of a wireless access terminal.

2. Background

Since the Internet explosion in the late 1990's, the market for wireless Internet applications has grown rapidly. As wireless communication systems have evolved from the first voice-only cellular telephone systems to high-speed digital data networks capable of delivering voice, Internet, and even streaming video content to miniature handheld units, so have the applications that rely on wireless networks. Wireless communication systems now include high-speed digital data networks capable of delivering voice, Internet, and even streaming video content to handheld units that users carry with them and use as they travel. Several systems have been proposed to satisfy the growing need for efficient, high-throughput packet data services.

Wireless packet data systems have been designed to allow users to access packet data networks such as the Internet from stationary or mobile user equipment. The user equipment is sometimes called an Access Terminal (AT), which connects wirelessly with the Internet through a wireless infrastructure system called an Access Network (AN). The AN generally includes multiple Access Points (AP), each having a limited transmit and receive range. The area within the transmit and receive range of a particular AP is a coverage area.

A wireless data system that supports non-stationary ATs must permit an AT to move from the coverage area of one AP to that of another AP without losing the AT's connection with the AN. The process of rerouting data for an AT from a first AP to a second AP is called handoff. This rerouting process generally causes a brief interruption in data communication with the AT. A handoff of an AT from one AP to another AP may require changing channels within the same frequency band (intra-frequency handoff) or may require changing frequency bands (inter-frequency handoff). The TIA-856-A standard, entitled "cdma2000 High Rate Packet Data Air Interface Specification," and published by the Telecommunications Industry Association in 2004, describes methods of minimizing the duration of the interruption of data communication during intra-frequency handoff of an AT. But TIA-856-A does not provide ways to perform seamless inter-frequency handoff of an AT. Handoff of an AT from a source frequency band $F_1$ to a target frequency band $F_2$ will thus cause unacceptably long interruptions to services such as Voice over IP (VoIP), video telephony, network gaming, or other applications requiring high Quality of Service (QoS). Accordingly, it would be desirable to minimize the interruption in data flow that occurs during inter-frequency handoffs of an AT.

DETAILED DESCRIPTION

Embodiments disclosed herein address the above stated needs by providing an ability to perform handoff of an access terminal directly from a first sector operating in a first frequency band (transmitting and receiving on the forward and reverse links within an assigned frequency band or a pair of frequency bands) to a second sector operating in a second frequency band.

In an illustrative aspect, a wireless communication system includes an access terminal configured to maintain an active set comprising at least one first frequency sector operating in a first frequency band and a pre-active set comprising at least one second frequency sector operating in a second frequency band that is different from the first frequency band, and to generate a data source control signal for transmission to an access network indicating a handoff to the at least one second frequency sector based on a signal parameter measurement associated with the at least one second frequency sector. The wireless communication system further includes the access network, which is configured to receive the data source control signal, to route user data addressed to the access terminal through the at least one first frequency sector before receiving the data source control signal, and to reconfigure a path of user data addressed to the access terminal from being sent through the at least one first frequency sector to being sent through the at least one second frequency sector after the expiration of a predetermined period after the data source control signal is received at the access network from the access terminal.

In an illustrative aspect, an access terminal apparatus includes a control processor configured to maintain an active set comprising at least one first frequency sector operating in a first frequency band and a pre-active set comprising at least one second frequency sector operating in a second frequency band that is different from the first frequency band, and to generate a data source control signal to be transmitted to an access network indicating a handoff to the least one second frequency sector based on a signal parameter measurement associated with the at least one second frequency sector. The access terminal apparatus further includes a signal measurement module configured to measure at least one parameter of transmissions received at the access terminal from the at least one second frequency sector, to provide the signal parameter measurement.

In an illustrative aspect, an access network apparatus includes a router configured to route information between entities in the access network, wherein the router is configured to route user data addressed to an access terminal through a first access point associated with a first sector belonging to an active set corresponding to the access terminal, the active set comprising at least one first frequency sectors operating in a first frequency band. The access network apparatus further includes a control processor configured to perform, based on a data source control signal received from the access terminal, a router reconfiguration which causes the router to route user data addressed to the access terminal through a second access point associated with a second sector belonging to a pre-active set corresponding to the access terminal, the pre-active set comprising at least one second frequency sector operating in a frequency band that is different from the first frequency band.

Figure 1:
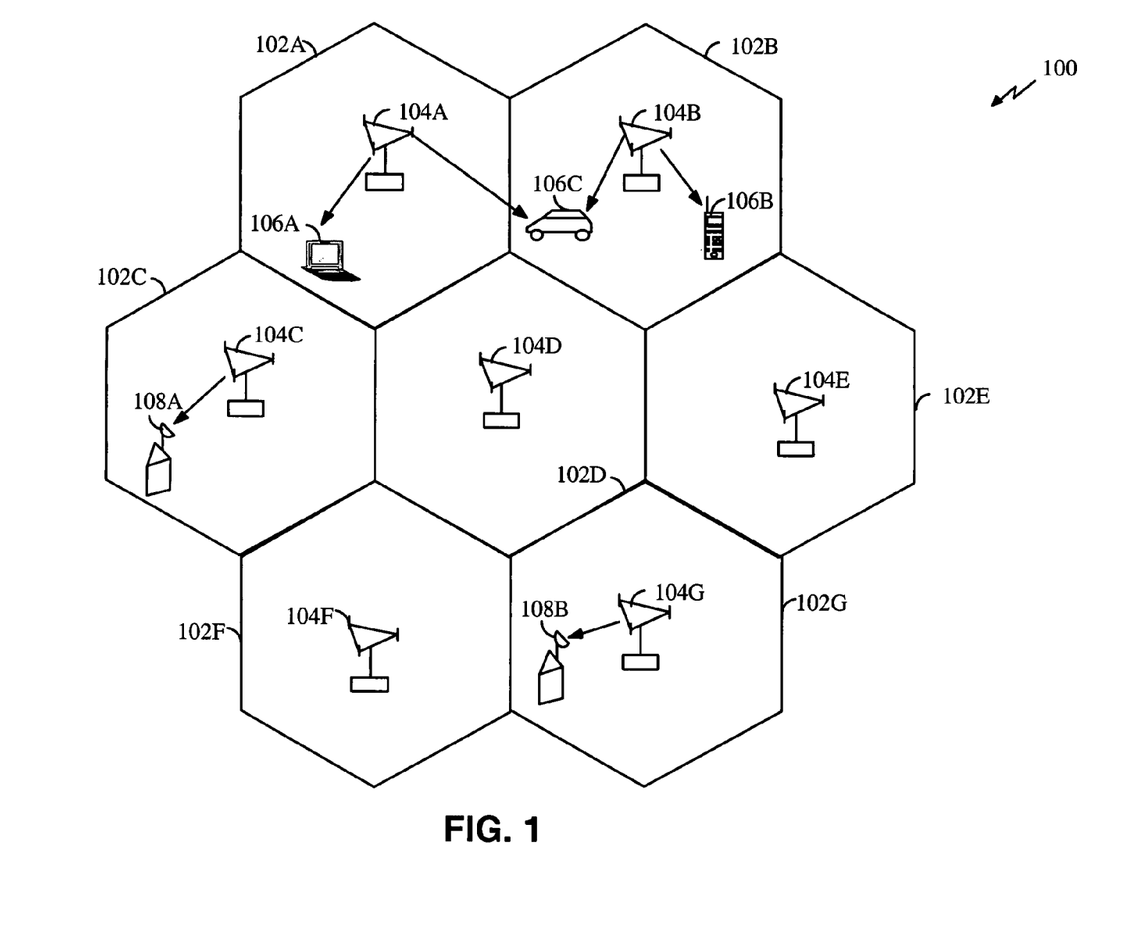
FIG. 1 is a high data rate system.

FIG. 1 shows a high data rate system (100) in accordance with an illustrative embodiment. As used herein, an Access Terminal (AT) is defined broadly to include any stationary subscriber unit (108A or 108B) or mobile subscriber unit (106A, 106B, or 106C). An AT may communicate through a wireless channel or through a wired channel, for example using fiber optic or coaxial cables. An access terminal may further be any of a number of types of devices including but not limited to PC card, compact flash, external or internal modem, a desktop or laptop personal computer that includes an external or internal modem, or a wireless or wireline telephone. An AT typically provides a connection between a single user or computer and the wireless Access Network (AN). But a single AT may also provide a connection that may be shared by multiple concurrent users or computers. An AN generally includes multiple access points (e.g., wireless base stations), base station controllers, and/or switches connected to each other.

An Access Point (AP) is defined broadly to include a single-sector or multiple-sector wireless base station, hub, or other network transceiver (104A-104G). Each AP has an associated coverage area called a "cell" (102A-102G), within which ATs may communicate with the AP at an acceptable data rate and signal quality level. Generally, an AP is part of the AN that provides a connection between one or more ATs and a terrestrial network such as the Internet. But an AP may also provide connections between one or more ATs and other types of networks, including other wireless networks. An AN may also provide a connection between one or more ATs and multiple networks, such as various combinations of corporate intranets, the Internet, and the Public Switched Telephone Network (PSTN).

The communication link through which an AT sends signals to access points in the AN is called a reverse link. The communication link through which APs send signals to an AT is called a forward link. The reverse link and forward link between an AP and an AT may reside within a single frequency band and be separated using time division duplexing. Alternatively, the reverse link and forward link between an AP and an AT may be separated by transmitting them within disjoint frequency bands. The term "frequency band" is used herein to mean either form of frequency assignment. In other words, an inter-frequency handoff between frequency bands in a system that uses time division duplexing to separate the forward link from the reverse link implies that an AT tunes its receiver and transmitter from one common frequency to a different common frequency. An inter-frequency handoff between frequency bands in a system that separates the forward and reverse links using disjoint frequency bands implies that an AT tunes its receiver and transmitter from one reverse-link/forward-link pair of frequencies to a different reverse-link/forward-link pair of frequencies.

Wireless standards provide specifications that promote compatibility between various manufacturers of ATs and AN equipment. One such wireless standard for wireless packet data systems is 1xEV-DO (also called 3GPP2 C.S0024-A or TIA-856-A). According to this standard, an active AT has one or more sectors in its active set. Each sector in the active set is associated with a different pilot signal offset. An AP may have multiple sectors, making it possible for the active set to contain more than one sector for the same AP, or "cell." The AT receives forward link data from one sector at a time. The AT sends a signal to the AN that indicates the best serving sector among the sectors in the active set. This signal is called the Data Rate Control (DRC) signal, and is generally transmitted on a DRC channel. The AT is said to "point" its DRC to the sector from which it may receive data next. As the name suggests, the DRC signal also indicates to the AN the rate at which data should be sent to the AT. The AT generally varies the DRC signal based on measurements taken at the AT of one or more forward link signal parameters. For example, if an AP transmits a pilot signal, the AT may vary the DRC signal based on the measured strength of the pilot signal received from a selected AP. Where the AP has multiple sectors, the AT may also identify in the DRC signal a specific sector from which the AP may transmit data to the AT.

Figure 2:
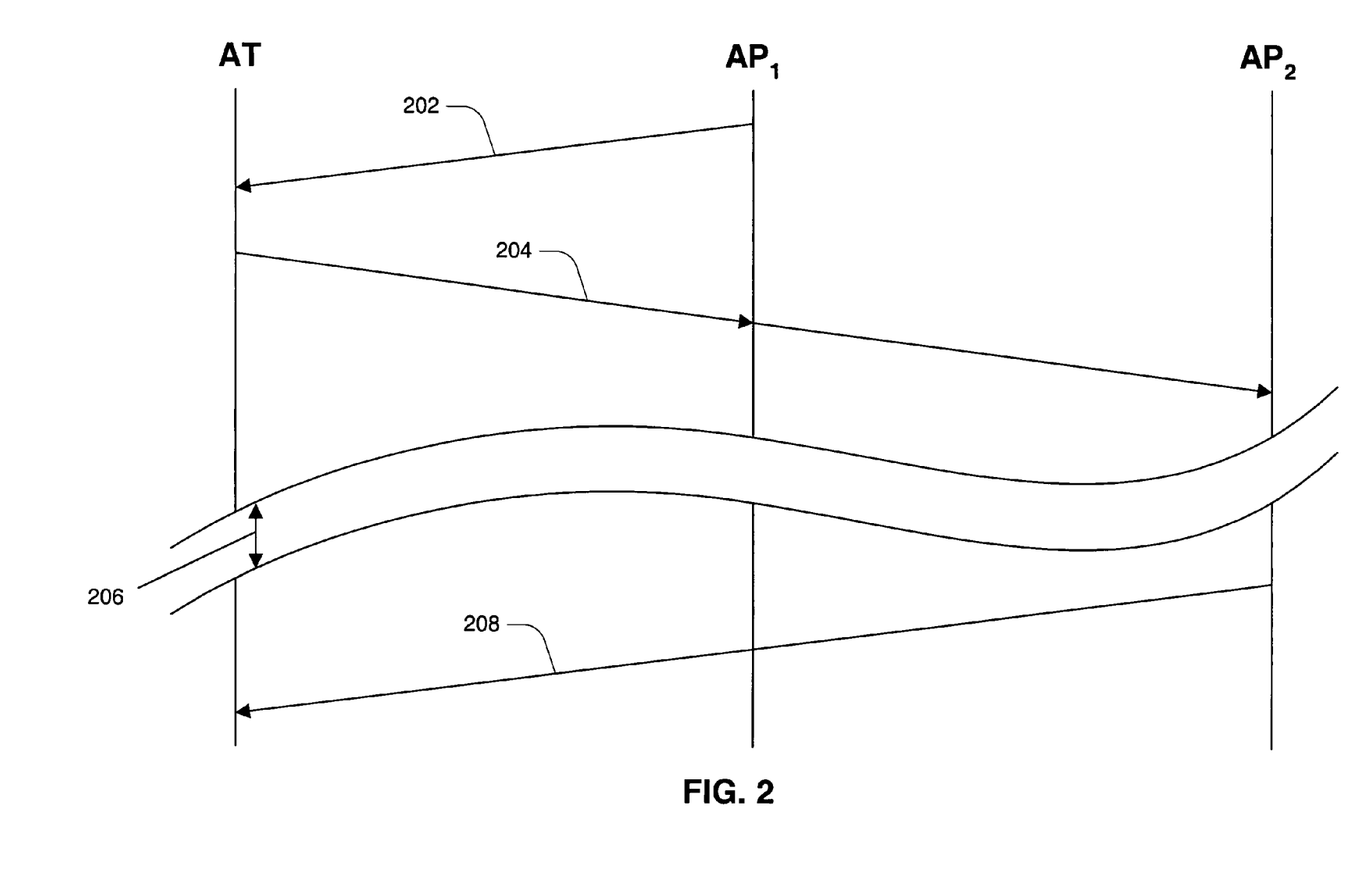
FIG. 2 is a call flow for intra-frequency handoff of an access terminal from a first sector to a second sector.

FIG. 2 shows an illustrative call flow for an intra-frequency handoff of an AT from a sector of a first AP ($AP_1$) to a sector of a second AP ($AP_2$). The AN sends data (202) from $AP_1$ at the rate requested by the AT. The AT sends a DRC signal (204) requesting to switch the serving sector from a source sector in a first AP ($AP_1$) to a destination (target) sector in a second AP ($AP_2$). After a time period (206) sufficient for the AN to reroute forward link data to the second AP ($AP_2$) associated with the target sector, the AT may receive data (208) from the target sector of the second AP ($AP_2$). If the source and target sectors belong to the same AP, then the AT may handoff between them without incurring the delay (206). But where the source and target sectors belong to different APs, the delay (206) is necessary to allow the AN to reroute data to the new cell. Even though the AT has pointed its DRC to a sector of the second AP ($AP_2$), the network will not be able to transport data to or from the AT through the second AP ($AP_2$) until after the delay (206). For some applications, this handoff process may result in an unacceptable interruption in the data flow.

In revision A of the 1xEV-DO standard (3GPP2 C.S0024-A or TIA-856-A), a Data Source Control (DSC) signal was introduced. This signal is sent from the AT to the AN, and indicates the cell to which the AT will point its DRC after a specified delay time. In an illustrative system, the specified delay time is measured in slots and is called "DSCLength." Alternatively DSCLength may be measured in some other time increment, or may be identified by some other technique such as by indicating an index into a lookup table of possible time periods. DSCLength is chosen to provide sufficient time for the AN to reroute forward link data from the source sector to the target sector identified in the DSC signal. The DSC signal provides advance notification to the AN of the AT's intention to point its DRC at a sector belonging to the target cell, thereby minimizing the interruption in data flow to the AT caused by the handoff.

Figure 3:
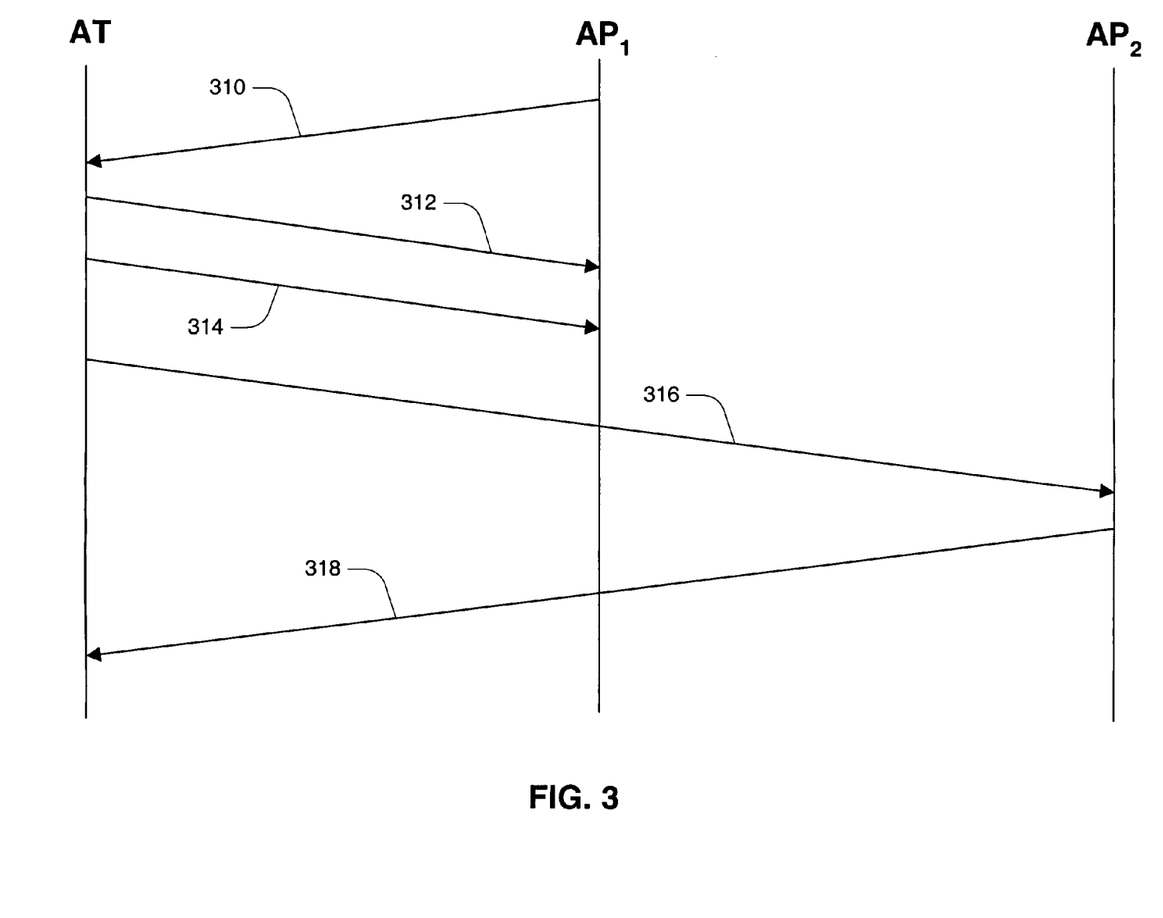
FIG. 3 is a call flow for intra-frequency handoff of an access terminal from a first sector to a second sector using a DSC signal.

FIG. 3 shows an illustrative call flow for intra-frequency handoff of an AT from a first AP ($AP_1$) to a second AP ($AP_2$) using a DSC signal. The AN sends data (310) from $AP_1$ at the rate requested by the AT. The AT sends a DSC signal (312) requesting to switch the serving sector from a source sector in a first AP ($AP_1$) to a target sector in a second AP ($AP_2$) after DSCLength slots. In an illustrative system, the AN provides the DSCLength parameter to the AT prior to the DSC signal (312). For example, the AN may provide the DSCLength parameter in a traffic channel assignment message, in an overhead broadcast message, in a signaling message directed exclusively to the AT, or in some other message. Alternatively, the AT may use a default value for DSCLength that is not sent over any wireless channel. After sending the DSC signal (312), the AT may optionally send a DRC signal (314) requesting data from the source sector ($AP_1$). One of skill in the art will recognize that, although the DSC signal (312) and DRC signal (314) are shown as transmitted from the AT only to the first AP ($AP_1$), any other AP operating in the same frequency band, including the second AP ($AP_2$), may also receive and decode signals transmitted by the AT. After the time period specified in DSCLength, the AT directs its DRC signal (316) to the target sector to the target sector ($AP_2$). The AT may then receive data (318) from the target sector ($AP_2$).

In an illustrative system, the AN may adjust DSCLength based on which sectors are in the active set of the AT. Based on this information, the AN may predict whether the AT will need to handoff to a target sector that is in the same cell as the source sector. If so, then the AN sets the DSCLength to a relatively short value. If the AT will likely handoff to a target sector in a different cell than the source sector, then the AN sets the DSCLength to a longer value to accommodate the longer time needed to reroute data through a different cell. By adjusting DSCLength based on this information, the AN may minimize or eliminate any interruption in the data flow caused by handoff.

In the systems described above, the AT is permitted to direct its DRC signals or its DSC signals at any sector that is in an "active set" assigned to the AT. In an illustrative embodiment, the AN assigns to each AT an active set of one or more sectors using a TrafficChannelAssignment message. The AN also provides a "neighbor set" of sectors whose signals the AT may monitor for possible addition to the active set. For example, the AN may identify the "neighbor set" using a message such as a SectorParameters or NeighborList message as defined in TIA-856-A. When the AT receives a strong signal from a sector in its neighbor set, it informs the AN by sending a RouteUpdate message. For example, the AT may use the RouteUpdate message format specified in section 9.7.6.2.1 of TIA-856-A. The AN then sends a TrafficChannelAssignment message that removes the sector from the neighbor set and adds it to the active set. Conversely, if the signal received from an active set sector becomes too weak, then the AT informs the AN with a RouteUpdate message. The AN then sends a TrafficChannelAssignment message that removes the weak sector from the active set.

When the active set of a given AT contains only one sector, the AT may not perform handoff. If the active set of an AT contains more than one sector, then the AT selects the sector in the active set based on the signal quality of the signals received by all sectors in the active set. The AT generally selects the sector from which it may receive data at the highest data rate. Once the AT identifies the best sector, it requests service from that sector using the DRC and DSC signals. On the reverse link, all sectors in the AT's active set simultaneously demodulate the signals transmitted by the AT. This allows the AT to establish reverse link channels to new sectors without tearing down existing ones. In contrast, before a new sector may transmit on the forward link to an AT, any existing forward link channels from other sectors must first be abandoned. Thus, the reverse link utilizes "soft handoffs," but the forward link utilizes only "hard handoffs."

The embodiments described above relate to intra-frequency handoff, i.e., wherein the source sector and the target sector transmit within the same frequency band. These handoff techniques do not work as well when the source sector and the target sector operate on different frequencies. For example, the reverse link may not utilize soft handoff if the sectors in the active set are operating in different frequency bands. If two sectors transmit over different frequency bands, then they also receive data using different frequency bands.

The AT generally operates in only one frequency band at a time. Therefore, all sectors in the AT's active set must transmit on the same frequency band and must receive on the same frequency band. In order for the AT to handoff to a sector on a new target frequency band, it must handoff to a sector that is not in its own active set. Also, upon performing such a handoff, all sectors operating in the old source frequency band must be immediately removed from the AT's active set.

Figure 4:
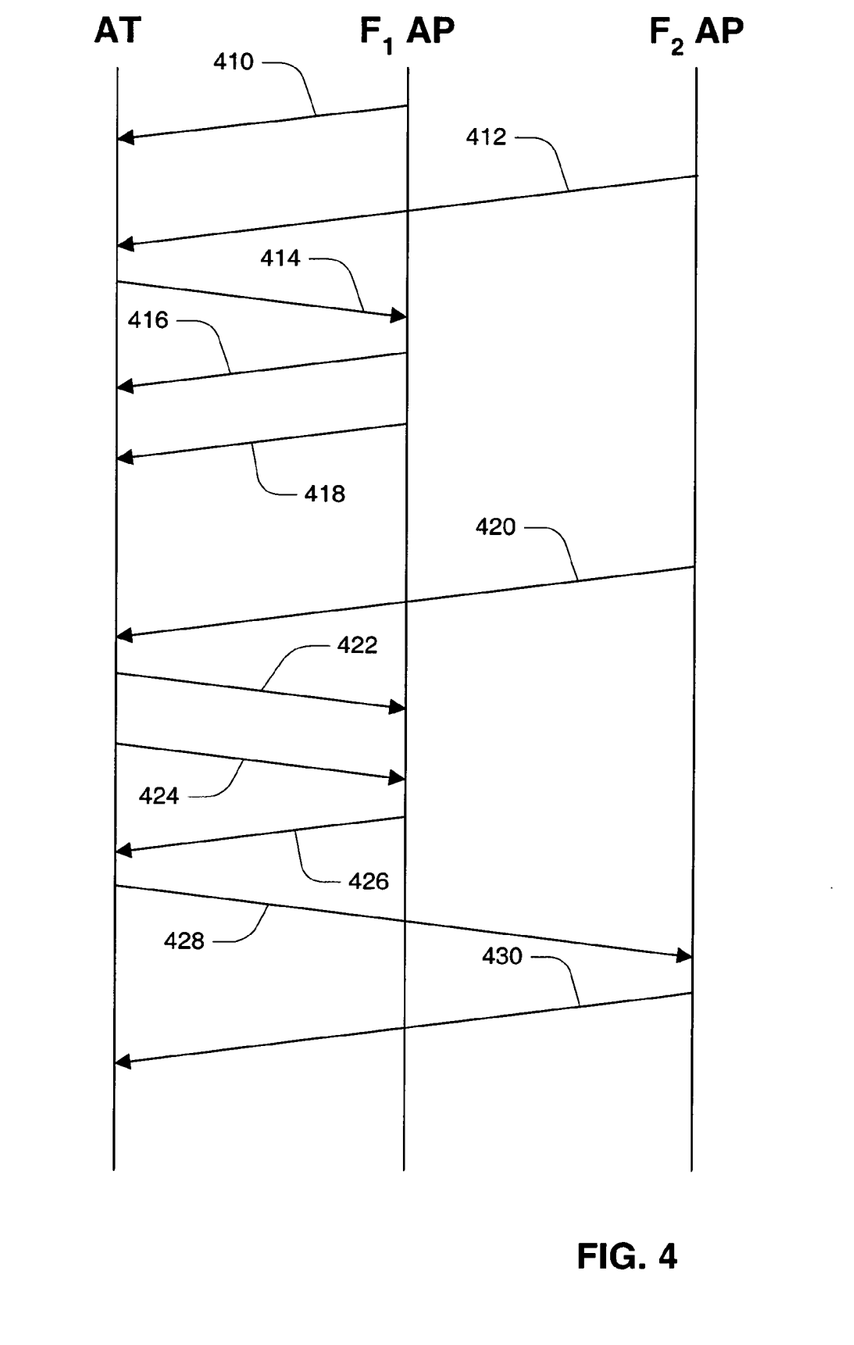
FIG. 4 is a call flow for a handoff of an access terminal from a sector operating in a first frequency band to a sector operating in a second frequency band.

FIG. 4 shows an illustrative call flow for a handoff of an AT from a sector operating in a first frequency band ($F_1$) to a sector operating in a second frequency band ($F_2$) in accordance with an embodiment. In an illustrative embodiment, the AT maintains an active set of sectors operating in the first frequency band ($F_1$) and a neighbor set of sectors. In an illustrative embodiment, the neighbor set includes sectors operating in the first frequency band ($F_1$) and sectors operating in the second frequency band ($F_2$). While receiving data (410) from an $F_1$ sector, the AT occasionally tunes its receiver to $F_2$ to measure parameters of signals (412) received on $F_2$. If one or more of the $F_2$ signals (412) becomes sufficiently strong (for example, as compared to signals from sectors in the active set), the AT sends a RouteUpdate message (414) indicating the strength of the $F_2$ signals. The AN sends a message (416) to the AT adding one or more sectors operating in $F_2$ to the pre-active set. In an illustrative embodiment, the message (416) used to add sectors to the pre-active set identifies which sectors are in the pre-active set. Alternatively, the pre-active set sectors may be identified in a separate message such as an UpdateParameters message. In an illustrative embodiment, the UpdateParameters message or a traffic channel assignment message indicates the DSC values associated with APs operating in frequencies in the pre-active set. No dedicated resources are assigned by the AN for the AT (either on the forward link or on the reverse link) at the pre-active set sectors. However, the AT is allowed to point its DSC to a sector in the pre-active set (i.e., to a cell associated with a sector in the pre-active set).

In an illustrative embodiment, the AN may also send a message (418) to the AT indicating an InterfrequencyDSCLength value to be used in the event of a switch to a sector in the pre-active set. In an alternate embodiment, the AN optionally adjusts the DSCLength parameter used for handoff to any sector to be long enough to seamlessly switch to a sector in the pre-active set. The message (418) used to send the InterfrequencyDSCLength value may be an AttributeUpdateRequest, and may be sent in the same packet as message (416) or in a separate packet. Where a sector operating in the first frequency band ($F_1$) and the sector operating in a second frequency band ($F_2$) are collocated, the AN may set the DSCLength or InterfrequencyDSCLength to a relatively short value.

While receiving data from an $F_1$ sector, the AT occasionally retunes its receiver to $F_2$ to measure parameters of signals (420) received on $F_2$ from one or more sectors in the pre-active set. If the signals (420) from the one or more sectors in the pre-active set become sufficiently strong (for example, as compared to signals from sectors in the active set), the AT sends a DSC signal (422) indicating a switch to a target sector in the pre-active set. The AT will generally point its DSC to a sector on $F_2$ when the $F_2$ signals have become strong enough that it is desirable for the AT to start receiving data over $F_2$. In an illustrative embodiment, the AT unilaterally changes its DSC without receiving any explicit direction or permission from the AN to do so. In an alternate embodiment, the AT may change its DSC to a sector on $F_2$ only after receiving a hard handoff direction message or a traffic channel assignment message from the AN that indicates an inter-frequency handoff. Presumably, the AN uses pilot strength measurement information received from the AT to determine when to send the hard handoff direction message. For an InterfrequencyDSCLength period after the AT changes its DSC to a sector on $F_2$, the AT continues to direct DRC signals (424) to the selected sector operating in $F_1$, and may receive data (426) from the selected $F_1$ sector. After the InterfrequencyDSCLength time period passes, the AT tunes its receiver and transmitter to $F_2$ and may transmit DRC signals (428) indicating the data rate at which it may receive data (430) from the selected sector operating in $F_2$. The AT and the AN switch the active and pre-active sets. In other words, the active set becomes the pre-active set, and at least one sector in the pre-active set becomes the new active set.

In an illustrative embodiment, the AT sends a RouteUpdate message indicating the measured received signal qualities of signals received from sectors in the pre-active set. The RouteUpdate message may be sent before, after, or at the same time as the DSC signal indicating a switch to a pre-active set sector. The AN may then send a TrafficChannelAssignment message that enables the AT to switch directly into soft handoff with more than one pre-active set sector.

Figure 5:
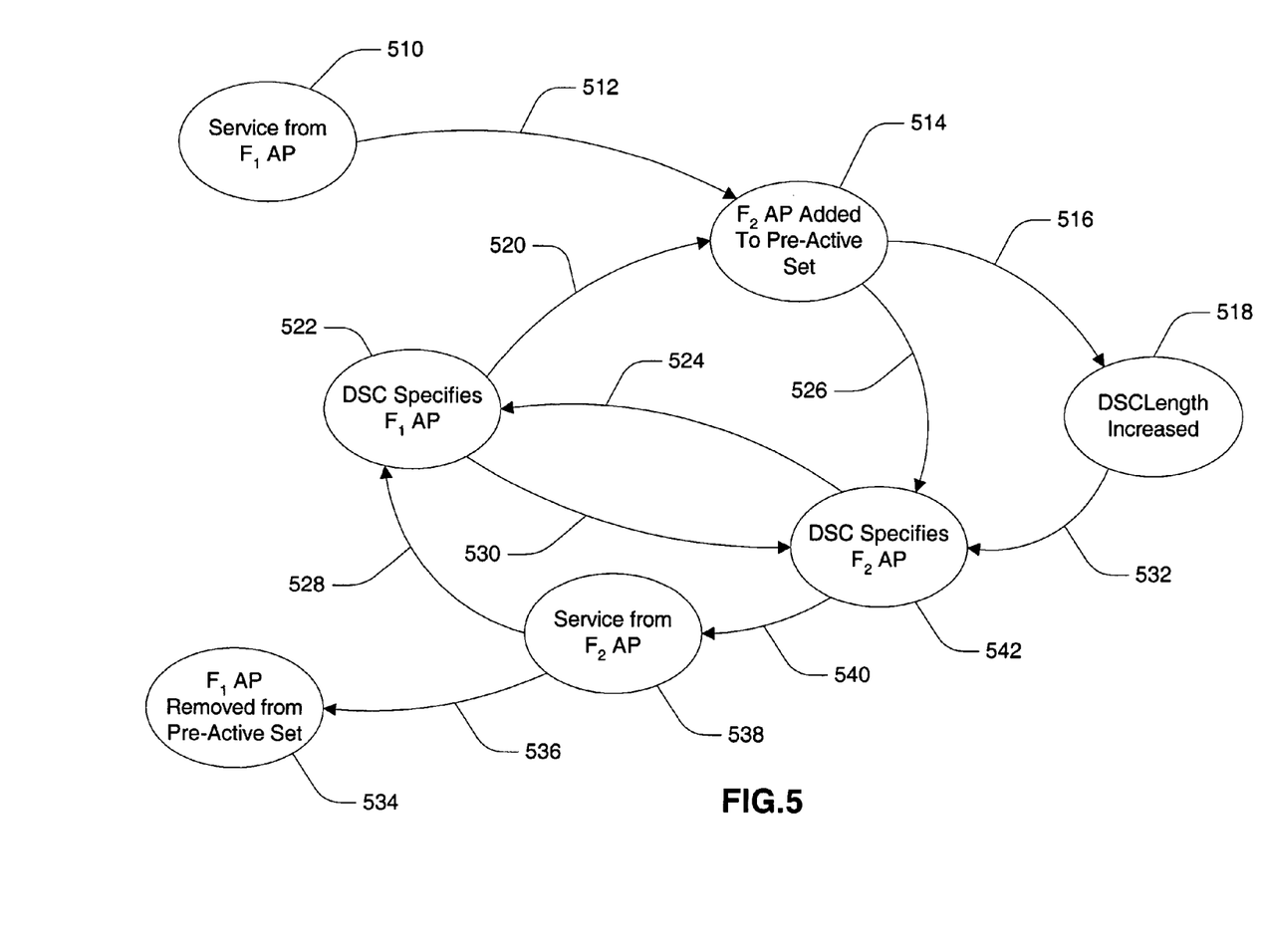
FIG. 5 is a state diagram of operation of an access terminal throughout an inter-frequency handoff.

FIG. 5 is a state diagram showing the different states of the AT in an illustrative embodiment. In state (510) the AT receives service (data) from an AP operating in $F_1$. As discussed above, the AT maintains an active set of sectors operating in the first frequency band ($F_1$) and a neighbor set of sectors that may include sectors operating in the first frequency band ($F_1$) and sectors operating in a second frequency band ($F_2$). While in state (510), the AT occasionally tunes its receiver to $F_2$ to measure parameters of signals received on $F_2$. If one or more of the $F_2$ signals becomes sufficiently strong (for example, as compared to signals from sectors in the active set), the AT sends a RouteUpdate message indicating the strength of the $F_2$ signals. The AN sends a message to the AT adding one or more sectors operating in $F_2$ to the pre-active set, at which time the AT transitions (512) to state (514). In an illustrative embodiment, the AT may receive an InterfrequencyDSCLength value or a new DSCLength value to be used in the event of a switch to a sector in the pre-active set that causes it to transition (516) to state (518).

In state (514) or state (518), the AT may receive data from active-set AP's operating in $F_1$, occasionally retuning its receiver to $F_2$ to measure parameters of signals received on $F_2$ from one or more sectors in the pre-active set. When the signals from at least one sector in the pre-active set become sufficiently strong (for example, exceeding the signal strength of the strongest sector in the active set by a predetermined amount), the AT transitions (526 or 532) to state (542), in which it sends a DSC signal indicating a switch to a target sector in the pre-active set. If, at the end of the InterfrequencyDSCLength or DSCLength period, the best received signal is one received on $F_2$, then the AT transitions (540) to state (538), in which it transmits DRC signals to sectors in the active set operating in $F_2$. When the AT transitions (540) from state (542) to state (538), the active set becomes the new pre-active set and the pre-active set becomes the new active set. In an illustrative embodiment, the new active set consists of the entire group of sectors that previously made up the pre-active set, and the new pre-active set consists of the entire group of sectors that previously made up the active set. In an alternate embodiment, the new active set may instead consist of some subset of the group of sectors that previously made up the pre-active set, and/or the new pre-active set may instead consist of some subset of the group of sectors that previously made up the active set.

On the other hand, if at the end of the InterfrequencyDSCLength or DSCLength period, a signal is received on $F_1$ that is more than a predetermined threshold stronger than any signal received on $F_2$, the AT instead transitions (524) to state (522), in which it directs its DSC signal to the strongest AP operating in $F_1$. The AT could then transition (520) to state (514), and direct its DRC signals to and receive data from an $F_1$ sector. In an illustrative embodiment, the AT could theoretically transition (530 and 524) back and forth between state (522) and state (542) indefinitely without receiving data. In alternate embodiment, once the AT transitions to a state (542) in which it switches from one frequency band to another, it must automatically transition (540) to a state (538) in which it may receive data at the new frequency band for at least a minimum time period, for example DSCLength. This minimum time period prevents the "ping-ponging" effect that could otherwise occur without any data being received at the AT.

While the AT is in state (538), it may receive data from active-set AP's operating in $F_2$, occasionally retuning its receiver to $F_1$ to measure parameters of signals received on $F_1$ from one or more sectors in its pre-active set. If the signals from at least one sector in the $F_1$ pre-active set become sufficiently strong (for example, exceeding the signal strength of the strongest sector in the active set by a predetermined amount), the AT transitions (528) to state (522), in which it sends a DSC signal indicating a switch to a target sector in the pre-active set. In contrast, if the signals from any sector in the pre-active set become sufficiently weak (for example, falling below an absolute or relative minimum signal strength compared to the strongest active set signal), then the AT transitions (536) to a state (534) in which the "weak" $F_1$ sector is removed from the pre-active set. In an illustrative embodiment, the AT removes an $F_1$ sector by sending a RouteUpdate message indicating the sector's weak received signal. The AN then sends the AT a TrafficChannelAssignment or other message directing the AT to remove the $F_1$ sector from the pre-active set.

The AT continues to direct DRC signals (424) to the selected sector operating in $F_1$, and may receive data (426) from the selected $F_1$ sector. After the DSCLength time period passes, the AT tunes its receiver and transmitter to $F_2$ and may transmit DRC signals (428) indicating the data rate at which it may receive data (430) from the selected sector operating in $F_2$. The active set becomes the pre-active set, and at least one sector in the pre-active set is included within the new active set.

In an illustrative embodiment, the AT sends a RouteUpdate message indicating the measured received signal qualities of signals received from sectors in the pre-active set. The RouteUpdate message may be sent before, after, or at the same time as the DSC signal indicating a switch to a pre-active set sector. The AN may then send a TrafficChannelAssignment message that enables the AT to switch directly into soft handoff with more than one pre-active set sector.

Figure 6:
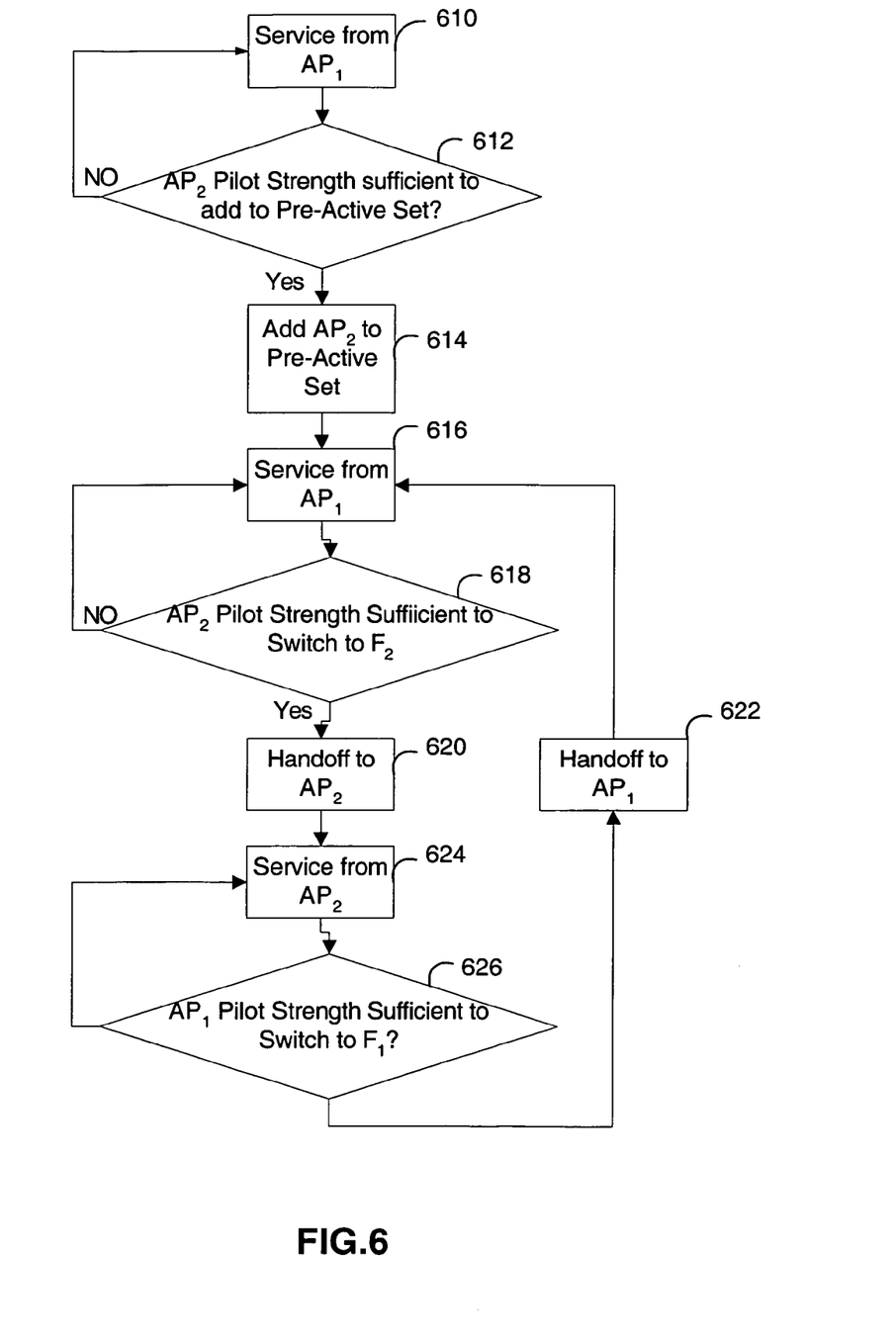
FIG. 6 is a flowchart showing the steps in an illustrative inter-frequency handoff method.

FIG. 6 is a flowchart showing the steps in an illustrative embodiment of an inter-frequency handoff method. At step (610) the AT may receive data from active-set sector $AP_1$ operating in frequency band $F_1$. At step (612), the AT periodically measures a parameter, such as pilot strength, of a signal received from pre-active-set sector $AP_2$ operating in frequency band $F_2$. If the measured $F_2$ parameter indicates that the AT could receive data from sector $AP_2$, then $AP_2$ is added to the pre-active set of the AT at step (614). Otherwise, if the $AP_2$ received signal is too weak to justify adding $AP_2$ to the pre-active set, then the AT continues at step (610) to receive data from sector $AP_1$.

After sector $AP_2$ is added to the pre-active set, the AT may receive data from sector $AP_1$ at step (616). While receiving data from sector $AP_1$, the AT periodically tunes its receiver to $F_2$ at step (618) and measures receiver parameters for signals received from sector $AP_2$. If the signals received from sector $AP_2$ become strong enough to warrant switching to $F_2$, then at step (620) the AT hands off to $AP_2$ operating in $F_2$. Conversely, if the signals received from sector $AP_2$ are not strong enough to warrant switching to $F_2$, then step (616) is repeated and the AT may continue to receive data from sector $AP_1$.

After handing off to sector $AP_2$ at step (620), the AT may receive data from sector $AP_2$ at step (624). While receiving data from sector $AP_2$, the AT periodically tunes its receiver to $F_1$ at step (626) and measures receiver parameters for signals received from sector $AP_1$. If the signals received from sector $AP_1$ become strong enough to warrant switching back to $F_1$, then at step (622) the AT hands off to $AP_1$ operating in $F_1$. Conversely, if the signals received from sector $AP_1$ are not strong enough to warrant switching back to $F_1$, then step (624) is repeated and the AT may continue to receive data from sector $AP_2$.

Figure 7:
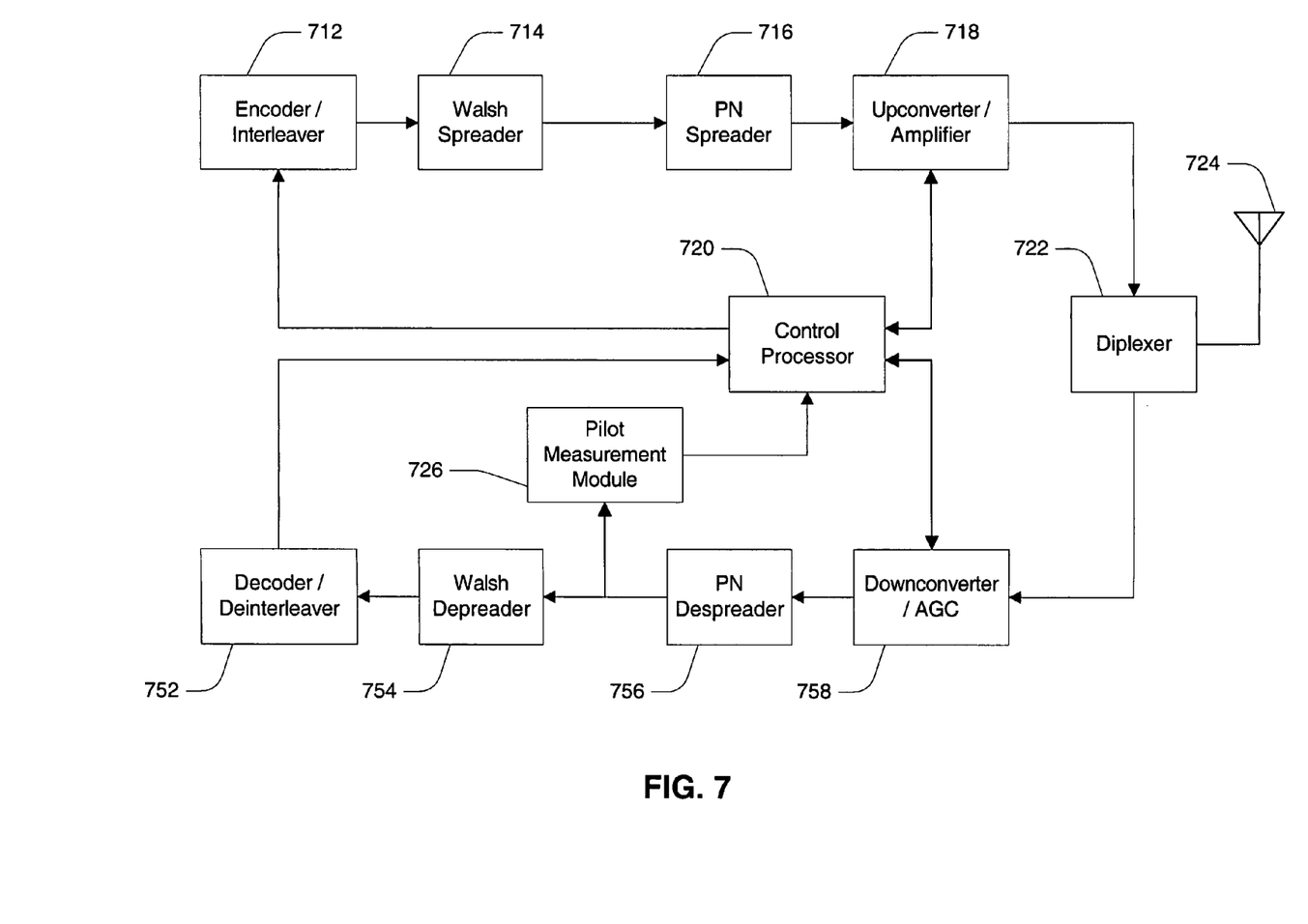
FIG. 7 is a block diagram of an illustrative access terminal apparatus configured to perform inter-frequency handoffs

FIG. 7 is a block diagram of an AT apparatus in accordance with an illustrative embodiment. Data is encoded and interleaved in Encoder/Interleaver (712). This data includes user data such as voice data, streaming video, or web browser data. This data also includes call control messages used for setup, tear-down, and handoffs of the communication link between the AT and the AN. Encoder/Interleaver (712) may use any of a variety of encoding techniques including forward error correction codes, syndrome codes, convolutional codes, and turbo codes. Encoder/Interleaver (712) may also use any of a variety of interleaving techniques such as block interleaving or bit-reversal interleaving. In an illustrative embodiment, Encoder/Interleaver (712) also performs signal-point conversion of the binary data into a form more suitable to spreading using Walsh and PN codes. The Encoder/Interleaver (712) encodes and interleaves the data to provide encoded data.

In an illustrative embodiment, the encoded data is then multiplied by a channel code such as a Walsh code in Walsh Spreader (714). One of skill in the art will recognize that another type of spreader that uses an alternate type of channel code could be used without departing from the illustrative embodiment. For example, an alternate channel coder may employ Gold codes, Pseudorandom Noise (PN) codes, or other orthogonal or non-orthogonal codes. The Walsh Spreader (714) channel codes the encoded data to provide channel coded data.

In an illustrative embodiment, the channel coded data is then spread by multiplying it by a complex PN code in PN spreader (716). One of skill in the art will recognize any of a variety of spreaders could be used without departing from the illustrative embodiment. For example, the despreader could alternatively utilize Gold codes or simple (real) PN codes. The channel coded data is PN spread in PN Spreader (716) to provide PN spread data.

In an illustrative embodiment, the PN spread data is then upconverted to radio frequencies and amplified in Upconverter/Amplifier (718). In an illustrative embodiment, Upconverter/Amplifier (718) also modulates the PN spread data using any of a variety of modulation techniques such as BPSK, QPSK, 16-QAM or 256-QAM. Upconverter/Amplifier (718) receives a frequency control signal from Control Processor (720) that controls the transmit frequency of the AT. The Upconverter/Amplifier (718) generates amplified data from the PN spread data.

In an illustrative embodiment, the amplified data is then provided to a diplexer (722) and is then transmitted through antenna (724). Though a single antenna is shown, one of skill in the art would recognize that the AT may utilize multiple receive and/or transmit antennas without departing from the illustrative embodiment. Diplexer (722) also permits signals received through antenna (724) to be provided to a Downconverter/Automatic Gain Control (AGC) (758) with minimal feedback interference from the amplified data generated by Upconverter/Amplifier (718).

Downconverter/AGC (758) downconverts signals received at the AT from the AN through antenna (724). Downconverter/AGC (758) also performs an AGC (automatic gain control) function to minimize quantization noise inserted into the data stream during the analog-to-digital conversion process. The extent of AGC needed is also used as a measure of overall received signal strength at the receiver frequency. This AGC information is provided to Control Processor (720).

The downconverted signal generated at Downconverter/AGC (758) is PN despread by multiplying the downconverted signal by a complex PN code at PN Despreader (756), similar to the PN Spreader (716), multiplying it by a complex PN code in PN spreader (716). One of skill in the art will recognize that any of a variety of despreaders could be used without departing from the illustrative embodiment. For example, PN Despreader (756) could alternatively utilize Gold codes or simple (real) PN codes.

In an illustrative embodiment, the signals transmitted from APs in the AN include a pilot channel signal that is either unmodulated with a Walsh code or utilizes the all-ones Walsh code. Thus the raw output of the PN Despreader (756) is provided to a Pilot Measurement Module (726) which measures the strength of the pilot signal received from each sector. For example, Pilot Measurement Module (726) could perform a simple integrate and dump function to provide a measure of energy-per-chip over noise-and-interference ($E_c/N_0$) of the received pilot signal. In an illustrative embodiment, the Pilot Measurement Module (726) is implemented as a circuit of an Application-Specific Integrated Circuit (ASIC). The Pilot Measurement Module (726) and the Control Processor (720) may reside within a common device such as an ASIC, or may reside within separate devices. The Pilot Measurement Module (726) may include an integrate-and-dump circuit. The Pilot Measurement Module (726) generates a pilot measurement signal that is provided to the Control Processor (720).

In an alternate embodiment, the Pilot Measurement Module (726) may measure some alternate parameter of the received signals other than strengths of pilot signals. For example, the Pilot Measurement Module (726) could instead estimate $E_c/N_0$ of a channel other than a pilot channel, such as a broadcast channel that carries data. In such an alternate embodiment, the Pilot Measurement Module (726) generates a signal strength measurement based on the alternate parameter and provides that information to the Control Processor (720).

The output of PN Despreader (756) is also provided to Walsh Despreader (754) which multiplies the PN-despread signal by one or more channel codes to extract the different channel signals. In an illustrative embodiment, the PN-despread signal is multiplied by one or more Walsh symbols, and integrated over a Walsh symbol period to determine the symbol value for each Walsh symbol. As with Walsh Spreader (714), one of skill in the art will recognize another type of despreader using an alternate type of channel code could be used without departing from the illustrative embodiment. For example, an alternate channel decoder may employ Gold codes, PN codes, or other orthogonal or non-orthogonal codes.

In an illustrative embodiment, the channel decoded signals from Walsh Despreader (754) are decoded and deinterleaved in Decoder/Deinterleaver (752). As with Encoder/Interleaver (712), Decoder/Deinterleaver (752) may use any of a variety of decoding techniques such as trellis decoding for convolutional codes, block codes, syndrome codes, and turbo codes. Decoder/Deinterleaver (752) may also use any of a variety of interleaving techniques such as block deinterleaving or bit-reversal deinterleaving. In an illustrative embodiment, Decoder/Deinterleaver (752) also converts the decoded and deinterleaved signal into binary data. The resultant binary data stream is then provided to Control Processor (720).

In an illustrative embodiment, call control messages to be encoded and interleaved in Encoder/Interleaver (712) are generated by a control processor (720). Control processor (720) may be any of a variety of devices capable of performing the functions described herein, such as a general purpose processor, a digital signal processor (DSP), or an application specific integrated circuit (ASIC). Control processor (720) may include memory (not shown) for storing program instructions and temporary data. This memory may include, for example, flash memory, Electrically Erasable Programmable Read-Only Memory (EEPROM), Random Access Memory (RAM), or any other type of memory suitable for storing program instructions and data needed to perform the functions described herein. The functions of the Control Processor (720) include receiving the decoded messages such as TrafficChannelAssignment and AttributeUpdateRequest messages through Decoder/Deinterleaver (752) and specifying DSC signals, DRC signals, and RouteUpdate messages that are transmitted through Encoder/Interleaver (712). Additionally, the Control Processor (720) controls the upconversion and downconversion frequencies utilized by the Upconverter/Amplifier (718) and Downconverter/AGC (758), respectively, during inter-frequency handoffs.

Figure 8:
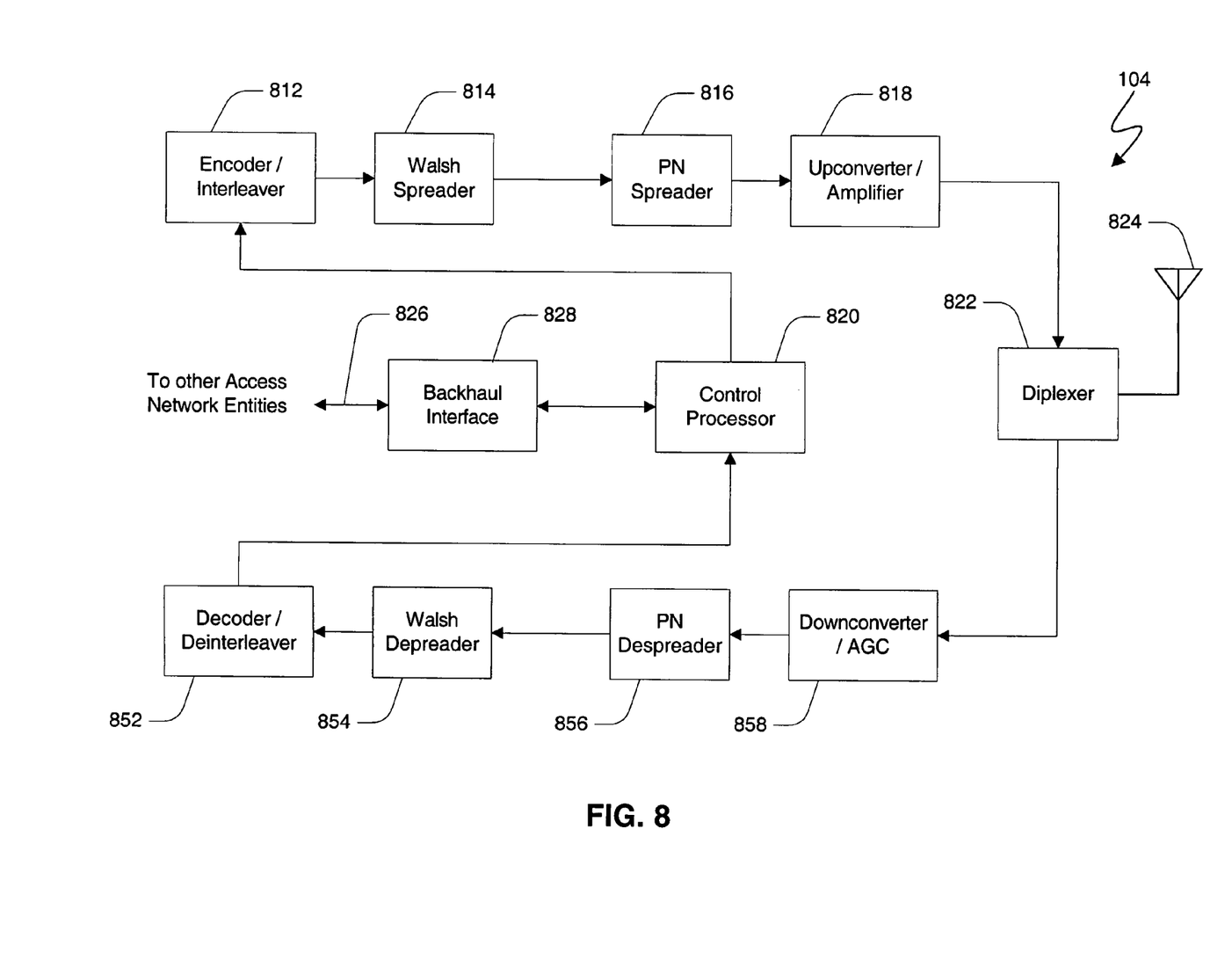
FIG. 8 is a block diagram of an illustrative access point apparatus configured to support inter-frequency handoff.

FIG. 8 is a block diagram of an AP apparatus (104) in accordance with an illustrative embodiment. The AN typically includes multiple APs and may also include a central controller (not shown) that routes data between the various other components of the AN, including each AP. Data is encoded and interleaved in Encoder/Interleaver (812). This data includes user data such as voice data, streaming video, or web browser data. This data also includes call control messages used for setup, tear-down, and handoffs of the communication link between the AT and the AN. Encoder/Interleaver (812) may use any of a variety of encoding techniques including forward error correction codes, syndrome codes, convolutional codes, and turbo codes. Encoder/Interleaver (812) may also use any of a variety of interleaving techniques such as block interleaving or bit-reversal interleaving. In an illustrative embodiment, Encoder/Interleaver (812) also performs signal-point conversion of the binary data into a form more suitable to spreading using Walsh and PN codes. The Encoder/Interleaver (812) encodes and interleaves the data to provide encoded data.

In an illustrative embodiment, the encoded data is then multiplied by a channel code such as a Walsh code in Walsh Spreader (814). One of skill in the art will recognize that another type of spreader that uses an alternate type of channel code could be used without departing from the illustrative embodiment. For example, an alternate channel coder may employ Gold codes, PN codes, or other orthogonal or non-orthogonal codes. The Walsh Spreader (814) channel codes the encoded data to provide channel-coded data.

In an illustrative embodiment, the channel coded data is then spread by multiplying it by a complex PN code in PN spreader (816). One of skill in the art will recognize that any of a variety of spreaders could be used without departing from the illustrative embodiment. For example, the despreader could alternatively utilize Gold codes or simple (real) PN codes. The channel-coded data is PN spread in PN Spreader (816) to provide PN spread data. The PN spreader (816) may further be configured to inject a pilot channel signal into the PN-spread data. For example, the PN spreader (816) might add a gain-adjusted all-ones Walsh signal to the output of the Walsh spreader before providing its output signal to Upconverter/Amplifier (818).

In an illustrative embodiment, the PN spread data is then upconverted to radio frequencies and amplified in Upconverter/Amplifier (818). In an illustrative embodiment, Upconverter/Amplifier (818) also modulates the PN spread data using any of a variety of modulation techniques such as BPSK, QPSK, 16-QAM or 256-QAM. Upconverter/Amplifier (818) receives a frequency control signal from Control Processor (820) that controls the transmit frequency of the AT. The Upconverter/Amplifier (818) generates amplified data from the PN spread data.

In an illustrative embodiment, the amplified data is then provided to a diplexer (822) and is then transmitted through antenna (824). Though a single antenna is shown, one of skill in the art would recognize that the AT may utilize multiple receive and/or transmit antennas without departing from the illustrative embodiment. Diplexer (824) also permits signals received through antenna (824) to be provided to a Downconverter/AGC (858) with minimal feedback interference from the amplified data generated by Upconverter/Amplifier (818).

Downconverter/AGC (858) downconverts signals received at the AT from the AN through antenna (824). Downconverter/AGC (858) also performs an AGC (automatic gain control) function to minimize quantization noise inserted into the data stream during the analog-to-digital conversion process. The extent of AGC needed is also used as a measure of overall received signal strength at the receiver frequency. This AGC information is provided to Control Processor (820).

The downconverted signal generated at Downconverter/AGC (858) is PN despread by multiplying the downconverted signal by a complex PN code at PN Despreader (856). Similar to PN Spreader (816) multiplying it by a complex PN code in PN spreader (816). One of skill in the art will recognize that any of a variety of despreaders could be used without departing from the illustrative embodiment. For example, PN Despreader (856) could alternatively utilize Gold codes or simple (real) pseudo-noise (PN) codes.

The output of PN Despreader (856) is also provided to Walsh Despreader (854) which multiplies the PN-despread signal by one or more channel codes to extract the different channel signals. In an illustrative embodiment, the PN-despread signal is multiplied by one or more Walsh symbols, and integrated over a Walsh symbol period to determine the symbol value for each Walsh symbol. As with Walsh Spreader (814), one of skill in the art will recognize that another type of despreader that uses an alternate type of channel code could be used without departing from the illustrative embodiment. For example, an alternate channel decoder may employ Gold codes, pseudo-noise (PN) codes, or other orthogonal or non-orthogonal codes.

In an illustrative embodiment, the channel-decoded signals from Walsh Despreader (854) are decoded and deinterleaved in Decoder/Deinterleaver (852). As with Encoder/Interleaver (812), Decoder/Deinterleaver (852) may use any of a variety of decoding techniques such as trellis decoding for convolutional codes, block codes, syndrome codes, and turbo codes. Decoder/Deinterleaver (852) may also use any of a variety of interleaving techniques such as block deinterleaving or bit-reversal deinterleaving. In an illustrative embodiment, Decoder/Deinterleaver (852) also converts the decoded and deinterleaved signal into binary data. The resultant binary data stream is then provided to Control Processor (820).

In an illustrative embodiment, call control messages to be encoded and interleaved in Encoder/Interleaver (812) are generated by a control processor (820). Control processor (820) may be any of a variety of devices capable of performing the functions described herein, such as a general purpose processor, a digital signal processor (DSP), or an application specific integrated circuit (ASIC). Control processor (820) may include memory (not shown) for storing program instructions and temporary data. This memory may include, for example, flash memory, electronically-erasable programmable read-only memory (EEPROM), random access memory (RAM), or any other type of memory suitable for storing program instructions and data needed to perform the functions described herein. The functions of the Control Processor (820) include receiving and interpreting DSC signals, DRC signals, and RouteUpdate messages that are received through Decoder/Deinterleaver (852), and forming messages such as TrafficChannelAssignment and AttributeUpdateRequest messages to be provided to Encoder/Interleaver (812) for transmission to ATs. The Control Processor (820) also coordinates the transmission of neighbor sets and identifies the operating frequencies of other APs in the AN. The Control Processor (820) sends and receives information to other entities in the AN through a backhaul interface (828) to a backhaul connection (826). In an illustrative embodiment, when the AP receives a DSC signal from an AT indicating that the AT will handoff to a frequency band other than the frequency band on which the AP is transmitting, the AP forwards the information to one or more other entities in the AN through the backhaul connection (826). The AP then participates in the synchronized switching of routing of data to the AT.

Figure 9:
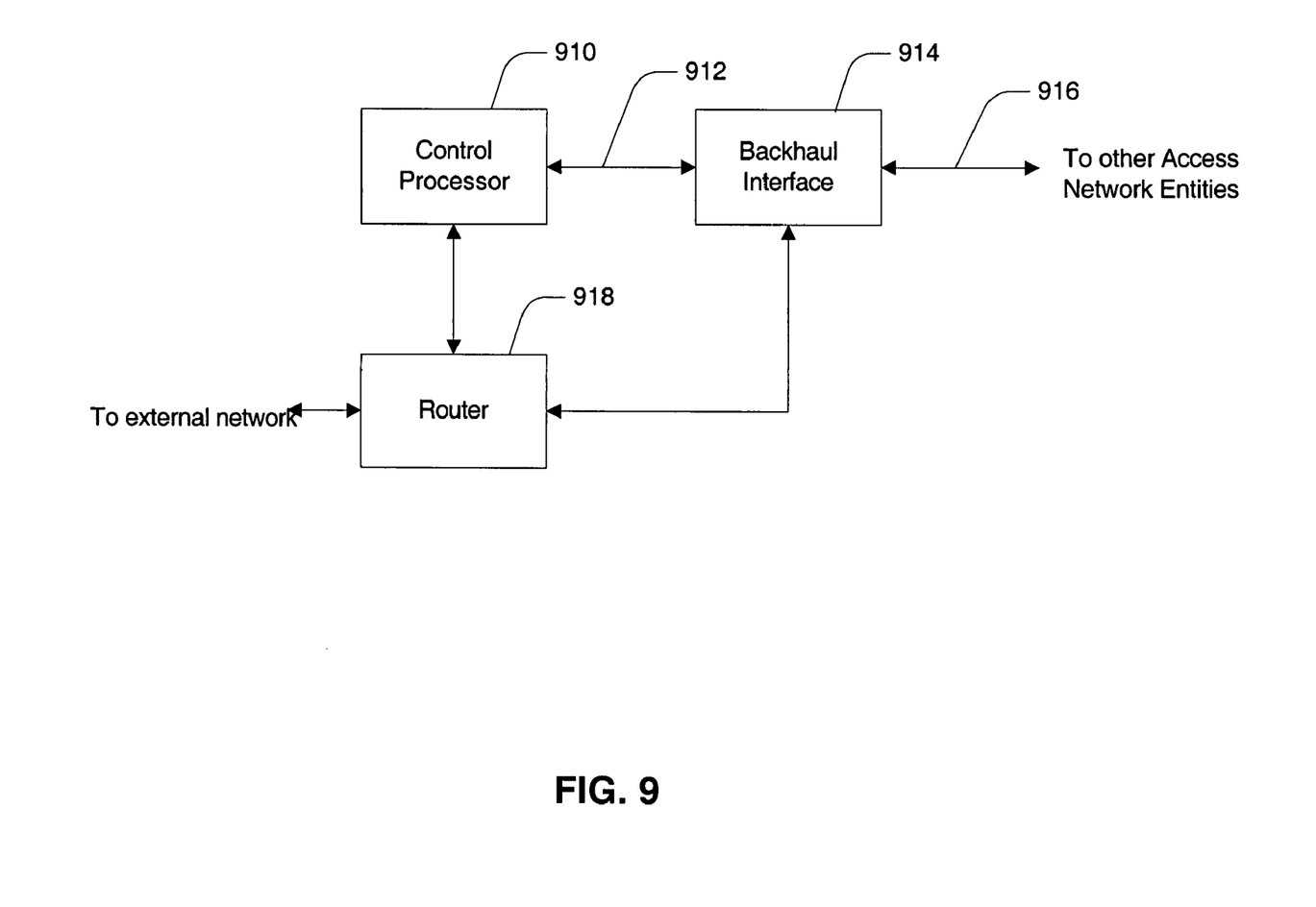
FIG. 9 is a block diagram of an illustrative access network controller.

In an illustrative embodiment, the AN includes at least one Access Network Controller (ANC), which communicates with other elements of the AN to coordinate routing of user data through the AN to and from ATs. FIG. 9 is a block diagram of an illustrative embodiment of an ANC. The ANC communicates with the other entities in the AN through its own backhaul interface (914). The ANC receives user data addressed to the AT from an external network such as the Internet and routes this user data through a router (918) to the corresponding serving AP for transmission to the AT over the forward link. Similarly, data received from each AT addressed to an entity in the external network is routed through the router (918) of the ANC.

A Control Processor (910) within the ANC receives DSC information from all APs in the AN. The Control Processor (910) may receive the DSC information through a connection (912) with the backhaul interface (914). Alternatively, the Control Processor (910) may transmit and receive information from APs in the AN through the Router (918), in which case the data connection (912) between the Control Processor (910) and the backhaul interface (914) may be unnecessary. Using the Control Processor (910), the ANC coordinates the timing of rerouting of user data necessitated by handoffs of an AT from one AP to another. Based on received DSC information, the Control Processor (910) adjusts the path of user data through the router (918). For example, when the ANC receives DSC information indicating an inter-frequency hard handoff of an AT from a serving sector to a target sector, the ANC reconfigures the router (918) so that data addressed to the AT is routed to the target sector at the appropriate time. In an alternate embodiment, the APs coordinate hard handoff rerouting among them without the ANC reconfiguring the router (918). In an illustrative embodiment, the serving AP remains in the active set of the AT and continues to send and receive data from the AT until the expiration of the appropriate delay period (DSCLength or InterfrequencyDSCLength). After the expiration of the appropriate delay period, the serving AP is moved from the active set of the AT to the pre-active set of the AT, and no longer sends data to, or receives data from, the AT.

Note, each of the embodiments illustrated in FIGS. 7-9 may include a memory storage unit, such as a Look up Table, (not shown) for storing active set and/or pre-active set information. Additionally, such memory storage may also store parameters used in handoff decisions.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An illustrative storage medium is coupled to the processor such the processor may read information from, and write information to, the storage medium. In the alternative, the storage medium may be integral to the processor. The processor and the storage medium may reside in a single ASIC. The ASIC may reside in an access terminal or in an access point. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An access terminal apparatus comprising:
    means for maintaining at an access terminal an active set having a serving sector and comprising at least one first frequency sector operating in a first frequency band and a pre-active set comprising at least one second frequency sector operating in a second frequency band;
    means for receiving a data source control length parameter from an access network indicating a time period for delaying a handoff from the serving sector to a target sector in the pre-active set, wherein the time period corresponds to a sufficient amount of time for rerouting forward link data from the serving sector to the target sector, wherein the time period is adjusted depending on a location of the target sector relative to the serving sector;
    means for generating, based on a signal parameter measurement associated with the at least one second frequency sector, a data source control signal indicating the handoff to the at least one second frequency sector; and
    means for measuring at the access terminal at least one parameter of transmissions received from the at least one second frequency sector, to provide the signal parameter measurement.

2. An access terminal apparatus comprising:
    a control processor configured to maintain an active set having a serving sector and comprising at least one first frequency sector operating in a first frequency band and a pre-active set comprising at least one second frequency sector operating in a second frequency band that is different from the first frequency band, to receive a data source control length parameter from an access network indicating a time period for delaying a handoff from the serving sector to a target sector in the pre-active set, wherein the time period corresponds to a sufficient amount of time for rerouting forward link data from the serving sector to the target sector, wherein the time period is adjusted depending on a location of the target sector relative to the serving sector, and to generate a data source control signal indicative of the handoff of the access terminal apparatus to the at least one second frequency sector based on a signal parameter measurement associated with the at least one second frequency sector; and
    a signal measurement module configured to provide the signal parameter measurement based upon a measurement of at least one parameter of transmissions received at an access terminal from the at least one second frequency sector.

3. The access terminal apparatus of claim 2, further comprising a tunable receiver configured to downconvert a received signal from a receive frequency that is based on a receive frequency control signal, wherein the control processor is further configured to vary the receive frequency control signal based on the first frequency band and on the second frequency band.

4. The access terminal apparatus of claim 2, wherein the at least one parameter comprises a strength of a pilot signal.

5. The access terminal apparatus of claim 2, wherein the at least one parameter comprises an energy-per-chip over noise-and-interference of a pilot signal.

6. The access terminal apparatus of claim 2, wherein the at least one parameter comprises an energy-per-chip over noise-and-interference of a signal other than a pilot signal.

7. The access terminal apparatus of claim 2, wherein the control processor is further configured to decode data received in the first frequency band for the time period after the data control signal is transmitted from the access terminal.

8. The access terminal apparatus of claim 7, wherein the control processor is further configured to switch the active set and the pre-active set after the time period.

9. The access terminal apparatus of claim 2, wherein the control processor is further configured to switch the active set and the pre-active set after the data control signal is transmitted from the access terminal.

10. The access terminal apparatus of claim 2, wherein the control processor is further configured to generate the data source control signal only when the signal parameter measurement exceeds, by a predetermined threshold, a first frequency measurement corresponding to transmissions received at the access terminal from the at least one first frequency sector.

11. The access terminal apparatus of claim 2, wherein when the source sector and the target sector are collocated, the time period comprises a first value, and wherein when the source sector and the target sector are not collocated, the time period comprises a second value, wherein the first value is less than the second value.

12. The access terminal apparatus of claim 2, wherein when the source sector and the target sector are with a same cell, the time period comprises a first value, and wherein when the source sector and the target sector are within different cells, the time period comprises a second value, wherein the first value is less than the second value.

13. An access network apparatus comprising:
    a router configured to route information between entities in an access network, wherein the router is configured to route user data addressed to an access terminal through a first access point associated with a first frequency sector comprising a serving sector belonging to an active set corresponding to the access terminal, wherein the first frequency sector operates in a first frequency band, and wherein the router is further configured to transmit to the access terminal a data source control length parameter indicating a time period for delaying a handoff from the serving sector to a target sector in a pre-active set associated with the access terminal, wherein the time period corresponds to a sufficient amount of time for rerouting forward link data from the serving sector to the target sector, wherein the time period is adjusted depending on a location of the target sector relative to the serving sector;
    a control processor configured to perform, based on a data source control signal received from the access terminal, a router reconfiguration which causes the router to route the user data addressed to the access terminal through a second access point associated with a second frequency sector comprising the target sector belonging to the pre-active set, wherein the second frequency sector operates in a second frequency band that is different from the first frequency band, wherein the control processor is located within an access point controller; and a backhaul interface configured to transport information between the access point controller and the first access point and to transport information between the access point controller and the second access point.

14. The access network apparatus of claim 13, further comprising a PN spreader configured to add a pilot signal to a forward-link data signal transmitted from the first access point in the first frequency band to the access terminal.

15. The access network apparatus of claim 13, further comprising a PN spreader configured to add a pilot signal to a forward-link data signal transmitted from the second access point in the second frequency band to the access terminal.

16. The access network apparatus of claim 13, wherein the control processor is further configured to perform the router reconfiguration after an expiration of a predetermined period after the data control signal is received from the access terminal.

17. The access network apparatus of claim 13, wherein the control processor is further configured to perform the router reconfiguration after an expiration of a predetermined data source control period.

18. The access network apparatus of claim 13, wherein the control processor is further configured to switch the active set and the pre-active set upon performing the router reconfiguration.

19. The access network apparatus of claim 13, wherein when the source sector and the target sector are collocated, the time period comprises a first value, and wherein when the source sector and the target sector are not collocated, the time period comprises a second value, wherein the first value is less than the second value.

20. The access network apparatus of claim 13, wherein when the source sector and the target sector are with a same cell, the time period comprises a first value, and wherein when the source sector and the target sector are within different cells, the time period comprises a second value, wherein the first value is less than the second value.

21. A method for handing off an access terminal, comprising:

maintaining at the access terminal an active set having a serving sector and comprising at least one first frequency sector operating in a first frequency band and a pre-active set comprising at least one second frequency sector operating in a second frequency band that is different from the first frequency band;

receiving a data source control length parameter from an access network indicating a time period for delaying a handoff from the serving sector to a target sector in the pre-active set, wherein the time period corresponds to a sufficient amount of time for rerouting forward link data from the serving sector to the target sector, wherein the time period is adjusted depending on a location of the target sector relative to the serving sector;

generating, based on a signal parameter measurement associated with the at least one second frequency sector, a data source control signal indicating the handoff of the access terminal to the at least one second frequency sector; and measuring at the access terminal at least one parameter of transmissions received from the at least one second frequency sector, to provide the signal parameter measurement.

22. The method of claim 21, further comprising tuning a receiver from the first frequency to the second frequency after the data source control signal is sent from the access terminal.

23. The method of claim 21, further comprising measuring a strength of a pilot signal received at the access terminal in the second frequency band to provide the signal parameter measurement.

24. The method of claim 21, further comprising measuring an energy-per-chip over noise-and-interference of a pilot signal received at the access terminal in the second frequency band to provide the signal parameter measurement.

25. The method of claim 21, further comprising measuring an energy-per-chip over noise-and-interference of a signal other than a pilot signal received at the access terminal in the second frequency band to provide the signal parameter measurement.

26. The method of claim 21, further comprising decoding user data received at the access terminal in the first frequency band for the time period after the data control signal is transmitted from the access terminal.

27. The method of claim 26, further comprising switching the active set and the pre-active set after the time period.

28. The method of claim 21, further comprising switching the active set and the pre-active set after the data control signal is transmitted from the access terminal.

29. The method of claim 21, further comprising comparing the signal parameter measurement to a first frequency measurement corresponding to transmissions received at the access terminal from the at least one first frequency sector, wherein the generating the data source control signal is based on whether the signal parameter measurement exceeds the first frequency measurement by a predetermined threshold.

30. The method of claim 21, wherein when the source sector and the target sector are collocated, the time period comprises a first value, and wherein when the source sector and the target sector are not collocated, the time period comprises a second value, wherein the first value is less than the second value.

31. The method of claim 21, wherein when the source sector and the target sector are with a same cell, the time period comprises a first value, and wherein when the source sector and the target sector are within different cells, the time period comprises a second value, wherein the first value is less than the second value.

32. A method for handing off an access terminal, comprising:

routing user data addressed to the access terminal through a first access point associated with a first frequency sector comprising a serving sector belonging to an active set associated with the access terminal, wherein the first frequency sector operates in a first frequency band;

transmitting to the access terminal a data source control length parameter indicating a time period for delaying a handoff from the serving sector to a target sector in a pre-active set associated with the access terminal, wherein the time period corresponds to a sufficient amount of time for rerouting forward link data from the serving sector to the target sector, wherein the time period is adjusted depending on a location of the target sector relative to the serving sector;

based on a data source control signal received from the access terminal, routing the user data addressed to the access terminal through a second access point associated with a second frequency sector belonging to the pre-active set, wherein the second frequency sector operates in a second frequency band that is different from the first frequency band; and transporting information between an access point controller and the first access point and transporting information between the access point controller and the second access point via a backhaul interface.

33. The method of claim 32, further comprising transmitting a pilot signal from the first access point in the first frequency band.

34. The method of claim 32, further comprising transmitting a pilot signal from the second access point in the second frequency band.

35. The method of claim 32, further comprising waiting until an expiration of the time period after the data control signal is received from the access terminal before routing the user data addressed to the access terminal through the second access point.

36. The method of claim 32, further comprising waiting until the expiration of the time period before routing the user data addressed to the access terminal through the second access point.

37. The method of claim 32, further comprising switching the active set and the pre-active set upon routing the user data addressed to the access terminal through the second access point.

38. The method of claim 32, wherein when the source sector and the target sector are collocated, the time period comprises a first value, and wherein when the source sector and the target sector are not collocated, the time period comprises a second value, wherein the first value is less than the second value.

39. The method of claim 32, wherein when the source sector and the target sector are with a same cell, the time period comprises a first value, and wherein when the source sector and the target sector are within different cells, the time period comprises a second value, wherein the first value is less than the second value.

40. A non-transitory computer readable media having stored thereon a sequence of instructions which, when executed by a computer, cause the computer to perform the steps of:
- maintaining at an access terminal an active set having a serving sector and comprising at least one first frequency sector operating in a first frequency band and a pre-active set comprising at least one second frequency sector operating in a second frequency band that is different from the first frequency band;
- receiving a data source control length parameter from an access network indicating a time period for delaying a handoff from the serving sector to a target sector in the pre-active set, wherein the time period corresponds to a sufficient amount of time for rerouting forward link data from the serving sector to the target sector, wherein the time period is adjusted depending on a location of the target sector relative to the serving sector;
- generating, based on a signal parameter measurement associated with the at least one second frequency sector, a data source control signal indicating the handoff to the at least one second frequency sector; and
- measuring at the access terminal at least one parameter of transmissions received from the at least one second frequency sector, to provide the signal parameter measurement.

41. A non-transitory computer readable media having stored thereon a sequence of instructions which, when executed by a computer, cause the computer to perform the steps of:
- routing user data addressed to the access terminal through a first access point associated with a first frequency sector comprising a serving sector belonging to an active set associated with the access terminal, wherein the first frequency sector operates in a first frequency band;
- transmitting to the access terminal a data source control length parameter indicating a time period for delaying a handoff from the serving sector to a target sector in a pre-active set associated with the access terminal, wherein the time period corresponds to a sufficient amount of time for rerouting forward link data from the serving sector to the target sector, wherein the time period is adjusted depending on a location of the target sector relative to the serving sector;
- based on a data source control signal received from the access terminal, routing the user data addressed to the access terminal through a second access point associated with a second frequency sector belonging to the pre-active set, wherein the second frequency sector operates in a second frequency band that is different from the first frequency band; and
- transporting information between an access point controller and the first access point and transporting information between the access point controller and the second access point via a backhaul interface.

42. An access network apparatus, comprising:
- means for routing user data addressed to the access terminal through a first access point associated with a first frequency sector comprising a serving sector belonging to an active set associated with the access terminal, wherein the first frequency sector operates in a first frequency band;
- means for transmitting to the access terminal a data source control length parameter indicating a time period for delaying a handoff from the serving sector to a target sector in a pre-active set associated with the access terminal, wherein the time period corresponds to a sufficient amount of time for rerouting forward link data from the serving sector to the target sector, wherein the time period is adjusted depending on a location of the target sector relative to the serving sector;
- based on a data source control signal received from the access terminal, means for routing the user data addressed to the access terminal through a second access point associated with a second frequency sector belonging to the pre-active set, wherein the second frequency sector operates in a second frequency band that is different from the first frequency band; and
- means for transporting information between an access point controller and the first access point and transporting information between the access point controller and the second access point via a backhaul interface.

* * * * *